------ Porcelain made of siliceous sand with grain size distribution of the invention (Fig 3A Curve 2)

—·—·— Porcelain made of siliceous sand with coarse grain size distribution of the invention (Fig 3A Curve 3)

——— Porcelain made of siliceous sand with known grain size distribution (Fig 3A Curve 1)

United States Patent Office 3,674,519
Patented July 4, 1972

3,674,519
METHOD OF MANUFACTURING PORCELAIN FOR ELECTRIC INSULATORS BY CONTROLLING GRAIN SIZE
Noboru Higuchi and Yutaka Ogawa, Nagoya, and Akihiro Watanabe, Hiashima, Japan, assignors to NGK Insulators, Ltd., Nagoya, Japan
Filed Aug. 29, 1969, Ser. No. 855,465
Claims priority, application Japan, Nov. 21, 1968, 43/84,820
Int. Cl. C04b *33/26*
U.S. Cl. 106—46
10 Claims

ABSTRACT OF THE DISCLOSURE

The toughness of porcelain materials, or the crack-propagation-resistance thereof, can be improved by using quartz or calcined bauxite with a controlled grain size distribution. A method for producing porcelains with improved toughness, by firing at a temperature of 1,180° C. to 1,350° C., a body containing less than 30.0% by weight of quartz having a grain size distribution consisting of less than 2.0% by weight of particles with an effective diameter smaller than 10 microns and more than 97.0% by weight of particles with an effective diameter smaller than 50 microns, or a body containing 10.0 to 60.0% by weight of calcined bauxite grains having a grain size distribution consisting of less than on the order of about 3% by weight of particles with an effective diameter smaller than 1 micron and less than 60.0% by weight of particles with an effective diameter smaller than 10 microns and more than 97.0% by weight of particles with an effective diameter smaller than 60 microns.

---

This invention relates to a method for manufacturing porcelain for electric insulators, and more particularly to a method of manufacturing porcelain for electric insulators having an excellent resistance against crack propagation.

Feldspathic porcelain and alumina porcelain are known as porcelain material for electric insulators. The feldspathic porcelain belongs to quartz-feldspar clay system porcelains, which essentially consist of 20 to 40% by weight of feldspathic material, 15 to 30% by weight of quartz material, and 40 to 60% by weight of clay material. The feldspathic porcelain is featured in its low material cost and its excellent electric insulation, and it is very widely used for insulators. However, the mechanical strength of the feldspathic porcelain is rather low, e.g., its bending strength is about 800 to 1,100 kg./cm.², and hence, it has not been used for high-voltage insulators requiring high mechanical strength. The alumina porcelain belongs to alumina-feldspar-quartz-clay system porcelains, which essentially consist of 10 to 45% by weight of alumina, 20 to 40% by weight of feldspathic material, less than 30% by weight of quartz material, and 20 to 60% by weight of clay material. The alumina porcelain is featured in its high mechanical strength. In fact, a test piece of the alumina porcelain has proved to have a maximum bending strength of about 1,800 kg./cm.².

Accordingly, the application of the alumina porcelain to high-voltage insulators has been expanding. The alumina porcelain, however, has drawbacks in that its material cost is high and it requires a high vitrifying temperature.

It is well known that a suspension insulator has a metallic cap and a metallic pin, each cemented to a porcelain insulating body at its outer top end and at its inner lower end, respectively. Thus, a plurality of suspension insulators can be strung as a string of insulators by connecting the pin of each suspension insulator to the cap of the next lower insulator in succession. The porcelain body has a shade portion with a rib, which is formed by corrugating or waving the lower surface of the shade portion, so as to provide the surface leakage distance necessary for each insulator.

It has been frequently reported during the last two decades that suspension insulators are broken by the shooting of mischievous hunters, who take the suspension insulators for targets. When the suspension insulator is obliquely shot from below by a rifle bullet, the rib is hit and the shade portion is crashed down in pieces, and a crack is formed extending from the crashed surface along the radial direction of the suspension insulator (to be referred to as a "radial crack," hereinafter). If the radial crack propagates toward the head portion of the insulator in excess of the border between the metallic cap and the shade portion, the insulating strength of the insulator is so lowered that it cannot withstand the service voltage or an over-voltage applied across the insulators. Thus, there is caused an internal flashover along the thus propagated radial crack. The internal flashover produces an extremely high temperature to burn and gasify the material sealed within the metallic cap, such as paint, cork, cement, a metallic pin, etc. As a result, an explosive pressure is generated within the metallic cap, so that the porcelain, the cement, and the metallic pin are separated from the cap. The suspension insulator cannot then hold the conductor of the power line, and the line conductor is dropped to the ground, which means a serious power line fault.

The known porcelain insulators, consisting of the aforesaid feldspathic porcelain or alumina porcelain, have poor resistance against the propagation of cracks therein. In other words, with the known suspension insulator, if any crack is formed within the porcelain, the crack easily propagates. In order to minimize the length of the radial crack, various design modifications have been proposed, such as elongation of the head portion of the porcelain body and increasing the thickness of the shade, such modifications have, however, proved to be ineffective.

There has been made some improvement in the mechanical strength and electrical insulating strength of feldspathic porcelain, e.g., U.S. Pat. No. 3,097,101, in which the porcelain material consists of clay, flux material, and flint particles whose grain size is 1 to 45 microns dia. This U.S. patent is a development from studies of the effect of quartz on the mechanical strength of feldspathic porcelain.

On the other hand, the nature and behavior of the resistance against crack propagation (to be referred to as "crack-propagation-resistance," hereinafter) of porcelain insulators are entirely irrelevant to those of the mechanical strength and electric insulating strength thereof. Thus, the aforementioned developments in the mechanical strength and the electric insulating strength do not provide any substantial contribution to improvement of the crack-propagation-resistance. In fact, there has not been made any significant improvement in the crack-propagation-resistance of the porcelain, i.e., "the fracture toughness" (toughness).

Therefore, an object of the present invention is to provide a method for manufacturing porcelain for electric insulators, which has an excellent crack-propagation-resistance.

Another object of the present invention is to provide a method for manufacturing inexpensive porcelain for electric insulators, which has excellent electric characteristics and excellent mechanical strength.

A further object of the present invention is to provide a method for manufacturing porcelain for electric insulators, which can hold power line conductors, even when an excessively high mechanical shock is applied thereto, so as to mitigate the risk of the falling of power line conductors.

A still further object of the present invention is to provide a method for manufacturing porcelain for electric insulators, in which the distribution of the grain size of raw materials in the porcelain body is controlled.

A still further object of the present invention is to provide a method for manufacturing porcelain for electric insulators, in which the distribution of the grain size of raw materials in the porcelain body is restricted to a specific range, which is coarser than that of the prior arts.

A still further object of the present invention is to provide a porcelain for electric insulators having an excellent crack-propagation-resistance, which porcelain includes polycrystalline aggregates of crystals.

The foregoing objects and other objects as well as the characteristic features of the invention will become more apparent and more readily understandable by the following description and the appended claims when read in conjunction with accompanying drawings, in which:

Figure 1:
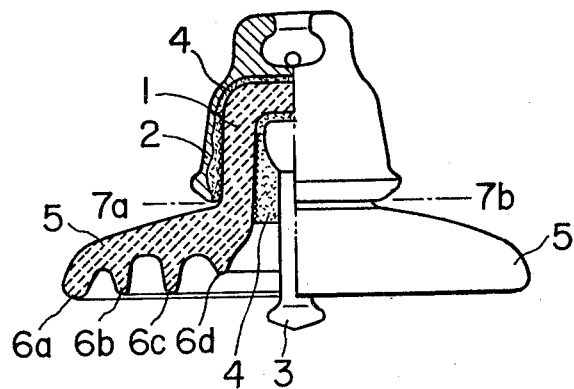
FIG. 1 is a front elevation of a suspension insulator, with a half thereof shown in section.

In the following description, a mixture of raw materials for porcelain production will be referred to as a "body," and the body which is ready for shaping after being refined, dehydrated and kneaded will be referred to as a "plastic body."

In an embodiment of the present invention, there is provided a method for manufacturing feldspathic porcelain, wherein a feldspathic body is prepared by mixing 30.0 to 50.0% by weight of finely pulverized feldspathic material, which is commercially available feldspathic powder or made by mechanically crushing raw feldspar followed by wet fine pulverization with a trommel, or made by further pulverizing the commercially available feldspathic powder; 10.0 to 30.0% by weight of quartz material, less than 2.0% by weight of the total quartz material being particles with an effective diameter smaller than 10 microns, while more than 97.0% by weight of the total quartz material being particles with an effective diameter smaller than 50 microns, said quartz material being made by pulverizing raw quartz material with a pulverizer, e.g., a vibrating mill, or by classifying commercially available quartz particles, e.g., siliceous sand, with a dry classifier or the like; 30.0 to 60.0% by weight of clay material, e.g., Gairome clay (clay available in Japan, mainly consisting of quartz and kaolin), Kibushi clay (clay available in Japan, mainly consisting of fine particles of kaolin), China clay, ball clay, kaolin, etc.; and the remainder of water. Special care is taken in the mixing process not to change the grain size distribution of the quartz material. For this end, a suitable mixer, like a trommel, is used for the mixing. The slurry of the body thus prepared is passed through a screen and a ferro-filter, so as to remove the impurities, such as sawdust, wooden chips, iron chips, etc. The slurry is then dehydrated into a cake by removing excess moisture by a suitable means, such as a filter press, so that the cake can be kneaded by a kneading machine, e.g., a deairing pug-mill, to produce a plastic body. The plastic body is dried, glazed, and fired at a temperature of 1,180° C. to 1,350° C. in a furnace, e.g., a tunnel kiln.

As another embodiment of the present invention, there is provided a method for manufacturing alumina porcelain in a manner similar to that for the manufacture of the feldspathic porcelain by using an alumina porcelain body comprising 20.0 to 40.0% by weight of feldspathic material, 5.0 to 25.0% by weight of quartz material, less than 2.0% by weight of the quartz material being particles with an effective diameter smaller than 10 microns while more than 97.0% by weight thereof being particles with an effective diameter smaller than 50 microns; 20.0 to 55.0% by weight of clay material; and 10.0 to 45.0% by weight of alumina material in the state as prepared by the Bayer's process or in the state as pulverized.

In another embodiment of the present invention, there is provided a method for manufacturing bauxite-containing porcelain in a manner similar to that for the manufacture of the feldspathic porcelain, by using a bauxite-containing body comprising 20.0 to 40.0% by weight of feldspathic material, up to 25.0% by weight of quartz material, 20.0 to 55.0% by weight of clay material, and 10.0 to 60.0% by weight of calcined bauxite, in which less than on the order of about 3% by weight of the calcined bauxite is particles with an effective diameter smaller than 1 micron and less than 60.0% by weight of the total calcined bauxite is particles with an effective diameter smaller than 10 microns while more than 97.0% by weight of the total calcined bauxite is particles with an effective diameter smaller than 60 microns. The calcined bauxite is prepared by crushing raw bauxite, for instance bauxite of the composition as shown in Table 1, into pieces with a diameter of 30 mm. or less, calcining the bauxite thus crushed at a temperature of 1,350° C. to 1,600° C. in a furnace, e.g., a rotary kiln, so as to produce the so-called calcined bauxite by removing water of crystallization and organic compounds in the raw bauxite, pulverizing the calcined bauxite by a pulverizer, e.g., a trommel and classifying the pulverized bauxite into the aforesaid grain size distribution. Due care must be taken in the mixing of the ingredients of the aforesaid mixture lest the grain size distribution of the pulverized bauxite should be changed.

In the method according to the present invention, it is also possible to use a body comprising 20.0 to 40.0% by weight of feldspathic material; up to 25.0% by weight of quartz material prepared by the aforesaid process, less than 2.0% by weight of the total quartz material being particles with an effective diameter smaller than 10 microns while more than 97.0% by weight of the quartz material being particles with a diameter smaller than 50 microns; 20.0 to 55.0% by weight of clay material; and 10.0 to 60.0% by weight of calcined bauxite prepared by the aforesaid process, less than on the order of about 3% by weight of the calcined bauxite being particles with an effective diameter smaller than 1 micron and less than 60.0% by weight of the total calcined bauxite being particles with an effective diameter smaller than 10 microns while more than 97.0% by weight of the total calcined bauxite being particles with a diameter smaller than 60 microns. In preparing the body, due care must be taken lest the grain size distribution of the quartz material and the calcined bauxite should be changed.

The composition of the product porcelain obtained by using calcined bauxite according to the present invention consists of 26.5 to 65.0% by weight of $SiO_2$, 24.5 to 68.1% by weight of $Al_2O_3$, 0.1 to 1.8% by weight of $Fe_2O_3$, 0.3 to 2.4% by weight of $TiO_2$, 0.03 to 0.4% by weight of CaO, 0.01 to 0.2% by weight of MgO, 2.0 to 6.5% by weight of $K_2O$ and 0.5 to 4.5% by weight of $Na_2O$.

If the quartz material with the aforesaid grain size distribution is included in a feldspathic body or an alumina body, the quartz particles are distributed in the vitreous matrix of the porcelain made of such body. If the calcined bauxite is included in the body, there are produced polycrystalline aggregates dispersed in the vitreous matrix of the porcelain, which polycrystalline aggregates consist of corundum and mullite (aggregate of $Al_2O_3$ and $3Al_2O_3 \cdot 2SiO_2$ in the state of particles). In the porcelain according to the present invention, with such quartz particles or polycrystalline aggregates dispersed in the vitreous matrix thereof, if a crack is generated, for instance by a rifle bullet, the crack can propagate with the microscopic linearity through the vitreous matrix, until encountering the quartz particles or the polycrystalline aggregates. When encountering the quartz particles or the polycrystalline aggregates, the cracks cease to propagate in the state as branched in a number of directions, while scattering or losing the cracking energy, because the crystalline structure of the quartz particles or the polycrystalline aggregates of corundum and mullite cannot be cracked by hitting with rifle bullets or the like.

Upon encountering with the quartz particles or the polycrystalline aggregates of corundum and mullite, if the cracks continue to propagate preferentially in such a manner that it avoids the quartz particles or the polycrystalline aggregates of corundum and mullite, without being branched, the path of the cracks is elongated and the crack-propagation-resistance increases to reduce the cracking energy.

In short, the quartz particles or the polycrystalline aggregates of corundum and mullite act as barriers to the propagation of crack, so that the cracks in the vitreous matrix of the porcelain become hard to propagate, and propagation of the cracks ceases at the quartz particles or the polycrystalline aggregates of corundum and mullite.

It is found that the quartz particles, or the mullite contained in the polycrystalline aggregates of corundum and mullite, can dissolve in the vitreous matrix of the porcelain surrounding the particles or the aggregates, and such dissolution of the quartz particles or the mullite in the polycrystalline aggregates of corundum and mullite tends to change the composition of the vitreous matrix so as to allow easy propagation of the cracks therethrough. According to the present invention, such dissolution of the quartz particles or the mullite in the polycrystalline aggregates of corundum and mullite is minimized by using quartz material and calcined bauxite material with a grain size larger than the corresponding grain size of known porcelain compositions, whereby a large amount of the quartz particles and the polycrystalline aggregates of corundum and mullite can be retained in the fired porcelain. At the same time, the reduction of the surface area of the quartz material or the calcined bauxite acts to prevent the dissolution of the quartz particles or the mullite in the polycrystalline aggregates of corundum and mullite into the vitreous matrix.

Generally speaking, the polycrystalline aggregates of corundum and mullite are produced by firing bauxite at a comparatively high temperature. However, titanium dioxide contained in bauxite acts as a mineralizer to allow the vitrification of porcelain at a low temperature. As a result, the porcelain can be fired at a comparatively low temperature, even when a considerably large amount of substance tending to deteriorate the sinterability is contained in the starting material. In other words, due to the mineralizing action of the titanium dioxide, the aforesaid polycrystalline aggregates can be contained in the fired porcelain at the desired high rate, despite the large grain size of the calcined bauxite and the comparatively low firing temperature at a temperature of 1,180° C. to 1,350° C., as defined in the foregoing.

Any commercially available materials can be used in the method according to the present invention, such as the feldspathic material, the quartz material, the clay material, the alumina material, raw bauxite, and so on. Table 1 shows some examples of the starting material usable in the method according to the present invention.

TABLE 1

[In percent by weight]

| Components | Starting material | | | | |
|---|---|---|---|---|---|
| | Feldspathic | Quartz | Clay | Alumina | Raw bauxite |
| Ignition loss | <1.5 | <1.3 | 10.0–16.0 | <1.0 | 11.0–33.0 |
| $SiO_2$ | 65.0–78.0 | >97.0 | 42.0–59.0 | <1.0 | 0.5–8.0 |
| $Al_2O_3$ | 12.0–20.0 | <1.5 | 27.0–42.0 | >98 | 53.0–80.0 |
| $Fe_2O_3$ | <1.0 | <1.0 | <1.8 | <0.5 | 0.7–4.0 |
| $TiO_2$ | <0.5 | <0.5 | <2.0 | <0.3 | 0.5–10.0 |
| CaO | <1.5 | <0.5 | <0.7 | <0.3 | <1.0 |
| MgO | <0.5 | <0.3 | <0.6 | <0.2 | <0.5 |
| $K_2O$ | 3.0–15.0 | <0.8 | <3.0 | <0.3 | <1.0 |
| $Na_2O$ | 1.0–10.0 | <0.8 | <2.0 | <1.0 | <1.0 |

In the method according to the present invention, the firing temperature is selected to be a temperature of 1,180° C. to 1,350° C., because the firing at a temperature lower than 1,180° C. results in an incomplete sintering, while firing at a temperature higher than 1,350° C. causes excessive dissolution of the quartz particles or the mullite in the polycrystalline aggregates of corundum and mullite.

In the method according to the present invention, the grain size distribution of the quartz material is selected to consist of less than 2.0% by weight of particles with an effective diameter smaller than 10 microns and more than 97.0% by weight of particles with an effective diameter smaller than 50 microns, because of the use of small particles in excess of the aforesaid grain size distribution can cause dissolution of the quartz particles, while the use of large particles in excess of the aforesaid grain size distribution improves the toughness of porcelain as compared with that of known porcelain but deteriorates the mechanical strength of the porcelain as compared with that of known porcelain.

The content of quartz material in the method according to the present invention is selected to be 10.0 to 30.0% by weight in feldspathic body, 5.0 to 25.0% by weight in alumina body, and up to 25.0% by weight with the aforesaid specific grain size distribution in bauxite-containing body, because if the content of quartz material of the aforesaid grain size is less than 10.0% by weight in feldspathic body or less than 5.0% by weight in the alumina body, the crack propagation cannot be prevented, while if the content of quartz material of the aforesaid grain size exceeds 30.0% by weight in the feldspathic body or 25.0% by weight in the alumina body or bauxite-containing body, the sintering of the body becomes difficult.

In the bauxite-containing body according to the present invention, if the grain size distribution of the quartz material is not specified, the content of quartz material is selected to be up to 25.0% by weight, because the quartz material in excess of 25.0% by weight makes the sintering of the body difficult.

In the bauxite-containing body according to the present invention, calcined bauxite is used, because the ignition loss of raw bauxite amounts to 10.0 to 30.0% by weight. Unless such ignition loss is precluded, there will be an excessively large firing shrinkage in the product, and the accuracy of the product will be deteriorated.

The calcined bauxite usable in the method according to the present invention is specified to consist of less than on the order of about 3% by weight of particles with an effective diameter smaller than 1 micron and less than 60.0% by weight of particles with an effective diameter smaller than 10 microns and more than 97.0% by weight of particles with an effective diameter smaller than 60 microns, and the content of the calcined bauxite in the bauxite-containing body is selected to be 10.0 to 60.0% by weight, because if more than on the order of about 3% by weight of the calcined bauxite has an effective diameter smaller than 1 micron and more than 60.0% by weight of the calcined bauxite has an effective diameter smaller than 10 microns and if the total content of the calcined bauxite in the bauxite-containing body is less than 10.0% by weight, the amount of the polycrystalline aggregates available for deterring the crack propagation becomes too small and the size of individual polycrystalline aggregates becomes too small to achieve satisfactory effects of preventing crack propagation, while the use of excessively coarse calcined bauxite containing more than 97.0% by weight of particles with an effective diameter smaller than 60 microns deteriorates the mechanical strength and the addition of a too large amount of calcined bauxite in excess of 60.0% by weight makes the sintering difficult.

In the method according to the present invention, the content of feldspathic material is selected to be 30.0 to 50.0% by weight in the feldspathic body or 20.0 to 40.0% by weight in the alumina body or bauxite-containing body, because less than 30.0% by weight of feldspathic material in the feldspathic body or less than 20.0% by weight of feldspathic material in the alumina body or bauxite-containing body makes the sintering difficult, while more than 50.0% by weight of feldspathic material in the feldspathic body or more than 40.0% by weight of feldspathic material in the alumina body or bauxite-containing body causes excessive melting of quartz particles or the mullite in the polycrystalline aggregates of corundum and mullite.

The content of clay material usable in the method according to the present invention is selected to be 30.0 to 60.0% by weight in the feldspathic body or 20.0 to 55.0% by weight in the alumina body or bauxite-containing body, because if the clay material in the body is less than or more than the aforesaid range, the body becomes hard to shape.

In the method according to the present invention, the content of alumina is selected to be 10.0 to 45.0% by weight in the alumina body, because the alumina content less than 10.0% by weight deteriorates the mechanical strength of the product, while the alumina content in excess of 45.0% by weight makes the sintering difficult.

Figure 2A:
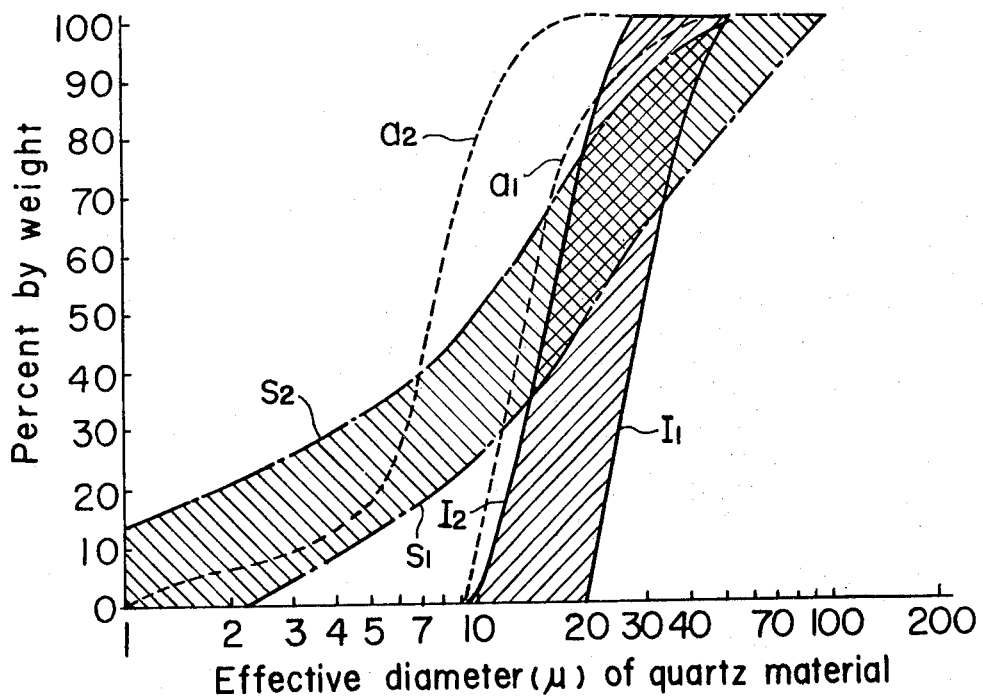
FIG. 2A is a graph showing the grain size distribution of quartz material usable in the method according to the present invention, in comparison with the corresponding grain size distribution of quartz, material used in known porcelain.

In general, it has been a practice in ceramic industries to express the grain size distribution of raw materials in percentage by weight of particles with an effective diameter smaller than a certain value. The unit commonly used for indicating the magnitude of the particle diameter is micron ($\mu$). FIG. 2A is a graph illustrating the grain size distribution of quartz material according to the present invention, in comparison with the corresponding grain size distribution of quartz material in known feldspathic body or known alumina body. The abscissa of FIG. 2A represents the effective diameter of quartz particle, while the ordinate represents the percentage by weight of those particles whose effective diameter is smaller than a certain value. In FIG. 2A, the range surrounded by curves $S_1$ and $S_2$ shows the grain size distribution of a known quartz material, which has been commonly used in the porcelain for electric insulators, and the range surrounded by curves $a_1$ and $a_2$ shows the grain size distribution of another quartz material, which was disclosed by U.S. Pat. No. 3,097,101. On the other hand, the grain size distribution of the quartz material according to the present invention lies in the range surrounded by curves $I_1$ and $I_2$. As can be seen from FIG. 2A, the grain size distribution of the quartz material, according to the present invention, is in a considerably coarser range of effective diameter than that of commonly used known quartz material.

The grain size distribution of the quartz material in the range surrounded by the curves $I_1$ and $I_2$ is tabulated in Table 2.

In measuring the grain size distribution, the sedimentation process is used.

TABLE 2

| I | II | III |
|---|---|---|
| | Percentage by weight of particles with an effective diameter smaller than the value in column I | |
| Effective diameter ($\mu$) | Limit for coarse distribution | Limit for fine distribution |
| 8 | 0 | 0 |
| 10 | 0 | 2.0 |
| 15 | 0 | 40.0 |
| 20 | 0 | 72.0 |
| 25 | 26.0 | 93.0 |
| 30 | 47.0 | 100.0 |
| 40 | 82.0 | 100.0 |
| 50 | 97.0 | 100.0 |
| 60 | 100.0 | 100.0 |

Figure 3A:
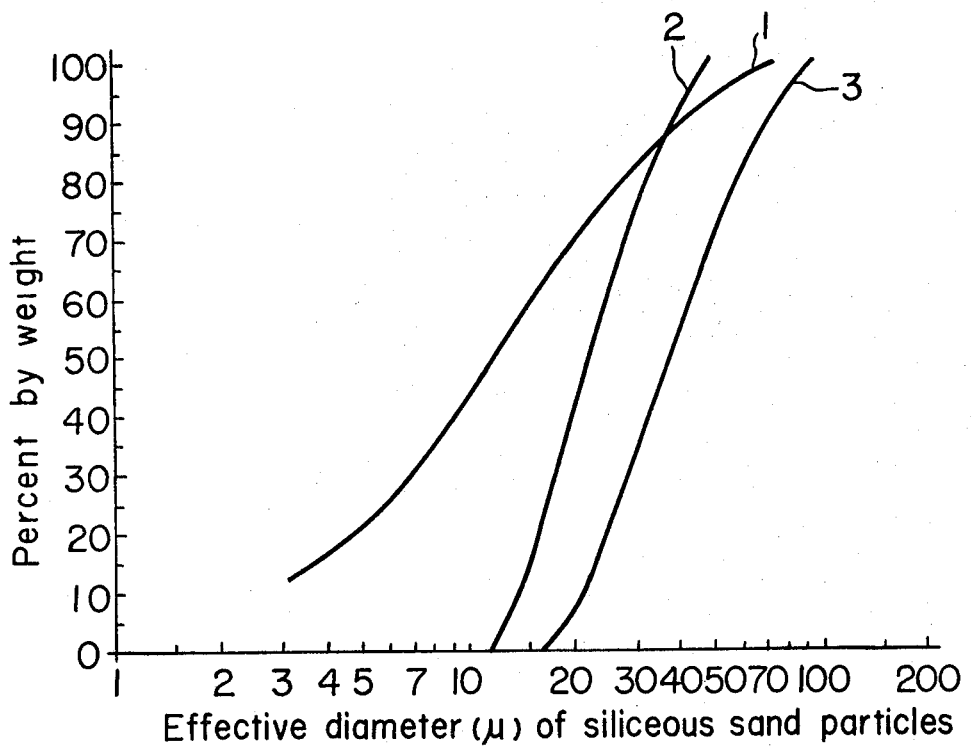
FIG. 3A is a graph showing the grain size distribution of quartz material used in an embodiment of the present invention.
Figure 4:
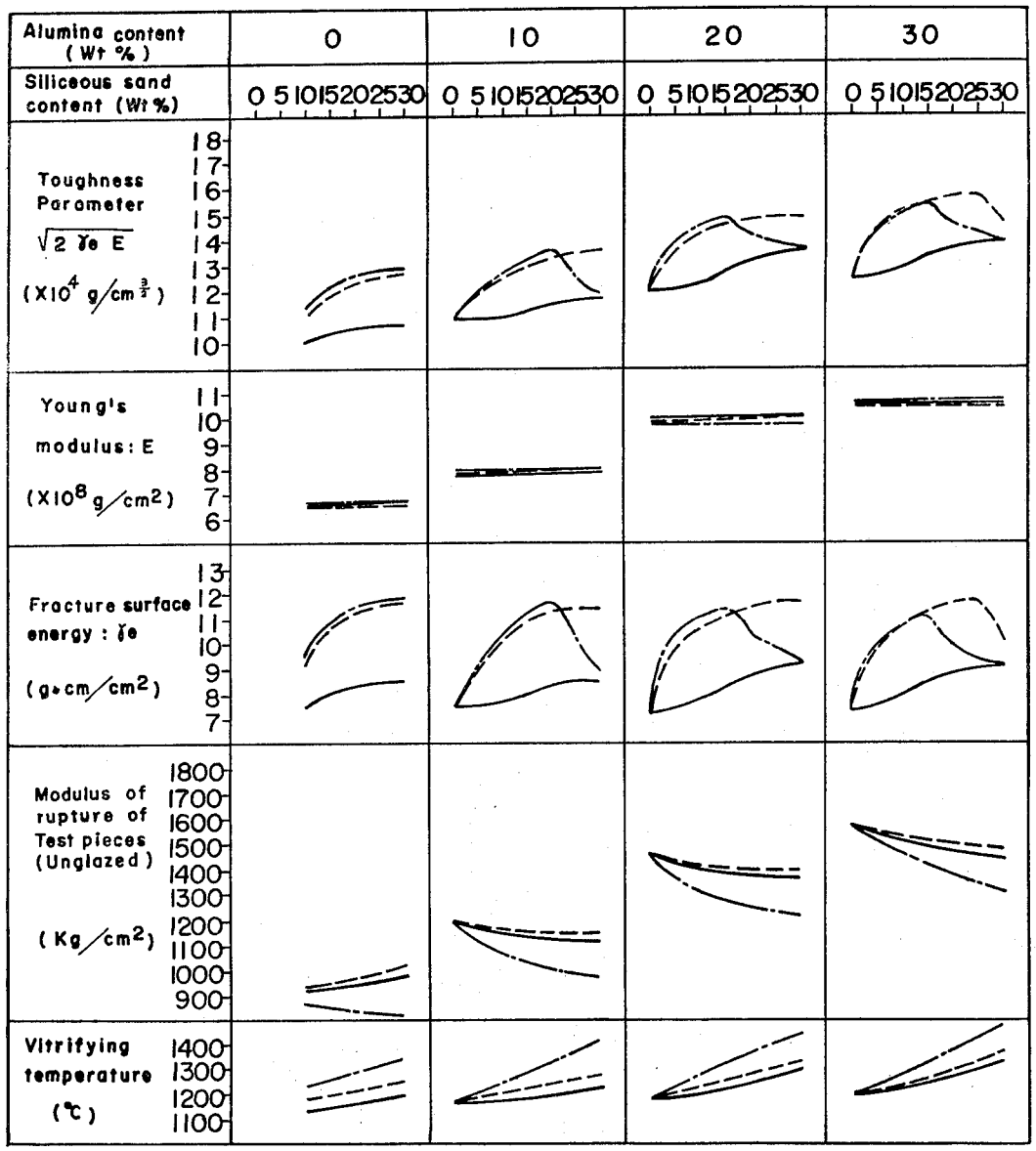
FIG. 4 is a diagrammatic illustration, showing how various properties of porcelain containing different amounts of alumina are affected by the content and grain size of quartz material used in the porcelain.

FIG. 4 shows properties of porcelain prepared by using bodies containing alumina at a rate of 0, 10.0, 20.0, or 30.0% by weight; and quartz materials (siliceous sand) with the grain size distributions, as shown in FIG. 3A, at a rate of 0, 5.0, 10.0, 15.0, 20.0, 25.0, or 30.0% by weight, respectively.

Table 3 tabulates the grain size distribution of the quartz materials of FIG. 3A.

TABLE 3

| I | II | III | IV |
|---|---|---|---|
| | Percentage by weight of particles with an effective diameter smaller than the value in column I | | |
| Effective diameter ($\mu$) | Grain size distribution curve 1 (Fig. 3A) | Grain size distribution curve 2 (Fig. 3A) | Grain size distribution curve 3 (Fig. 3A) |
| 8 | 35.0 | 0 | 0 |
| 10 | 44.0 | 0 | 0 |
| 15 | 59.0 | 15.0 | 0 |
| 20 | 69.0 | 42.0 | 6.0 |
| 25 | 78.0 | 63.0 | 21.0 |
| 30 | 83.0 | 76.0 | 32.0 |
| 40 | 90.0 | 92.0 | 54.0 |
| 50 | 94.0 | 100.0 | 69.0 |
| 60 | 97.0 | 100.0 | 79.0 |
| 70 | 99.0 | 100.0 | 88.0 |
| 80 | 100.0 | 100.0 | 92.0 |
| 90 | 100.0 | 100.0 | 97.0 |
| 100 | 100.0 | 100.0 | 100.0 |

The grain size distribution of quartz material of the column II of Table 3 (corresponding to the curve 1 of FIG. 3A) is in the known grain size distribution range of quartz materials, which have been commonly used in porcelain for electric insulators, and the grain size distribution of the column II lies within the range surrounded by the curves $S_1$ and $S_2$ in FIG. 2A. The grain size distribution of quartz material of the column III of Table 3 (corresponding to the curve 2 of FIG. 3A) is in the range according to the present invention, which is shown in FIG. 2A as surrounded by the curves $I_1$ and $I_2$. The grain size distribution of quartz material of the column IV of Table 3 (corresponding to the curve 3 of FIG. 3A) lies in a range coarser than that according to the present invention, which is shown in FIG. 2A as surrounded by the curves $I_1$ and $I_2$.

In FIG. 4, the solid line curves, the dash line curves, and the dash-dot line curves represent properties of porcelains made by using siliceous sands with grain size distribution of columns II, III, and IV of Table 3.

The inventors made a series of studies on the scale representing the crack-propagation-resistance to suppress the propagation of cracks leading to the mechanical breakdown of the porcelain, and as a result, a toughness parameter was selected based on the fundamental theory of crack propagation, which is equivalent to the square root of two times the product of the fracture surface energy $\lambda_e$ and the Young's modulus E of the porcelain, i.e., $\sqrt{2\lambda_e \cdot E}$. In other words, in FIG. 4, the larger the toughness parameter $\sqrt{2\lambda_e \cdot E}$ is, the larger the crack-propagation-resistance of the porcelain is, i.e., the tougher the porcelain is.

The measurement of various properties of sample porcelains of FIG. 4 was carried out as follows. The Young's modulus was measured by the Ewing's method with 8 mm. wide, 1.5 mm. thick, and 80 mm. long samples. The toughness parameter $\sqrt{2\gamma_e \cdot E}$ was measured by the Gilman's double cantilever beam method, which was described by J. J. Gilman for the measurement of single crystal, as described in Journal of Applied Physics, vol. 31, No. 12, p. 2208. Therefore, $\gamma_e$ could be calculated from the value of E and $\sqrt{2\gamma_e \cdot E}$. According to the "Nakayama's Work of fracture method," as described in Journal of American Ceramic Society, vol. 48, No. 11, p. 583, the fracture surface energy $\gamma_e$ can be measured by itself. The modulus of rupture was measured by the center point loading method with 300 mm. span cylindrical test pieces of 30 mm. dia. The vitrifying temperature was determined by firing the shaped bodies of materials with a 30 mm. dia. in a furnace while increasing the firing temperature at a rate of 120° C. per hour, and the fired bodies were withdrawn from the firing furnace at different temperatures, and the water absorption of each sample thus fired was measured, and the temperature corresponding to the sample with a water absorption of 0% was taken as the vitrifying temperature.

It is apparent from FIG. 4 that the toughness of porcelain made by using quartz material having a finer grain size distribution than that of the method according to the present invention is low. On the other hand, when quartz material having a coarser grain size distribution than that of the present invention, the toughness can be retained at a similar level to that of the present invention, while the modulus of rupture is drastically reduced. It can be also seen from FIG. 4 that the vitrifying temperature becomes higher as the grain size distribution of quartz material becomes coarser, as the content of the quartz material increases, and as the content of alumina increases, respectively.

Figure 2B:
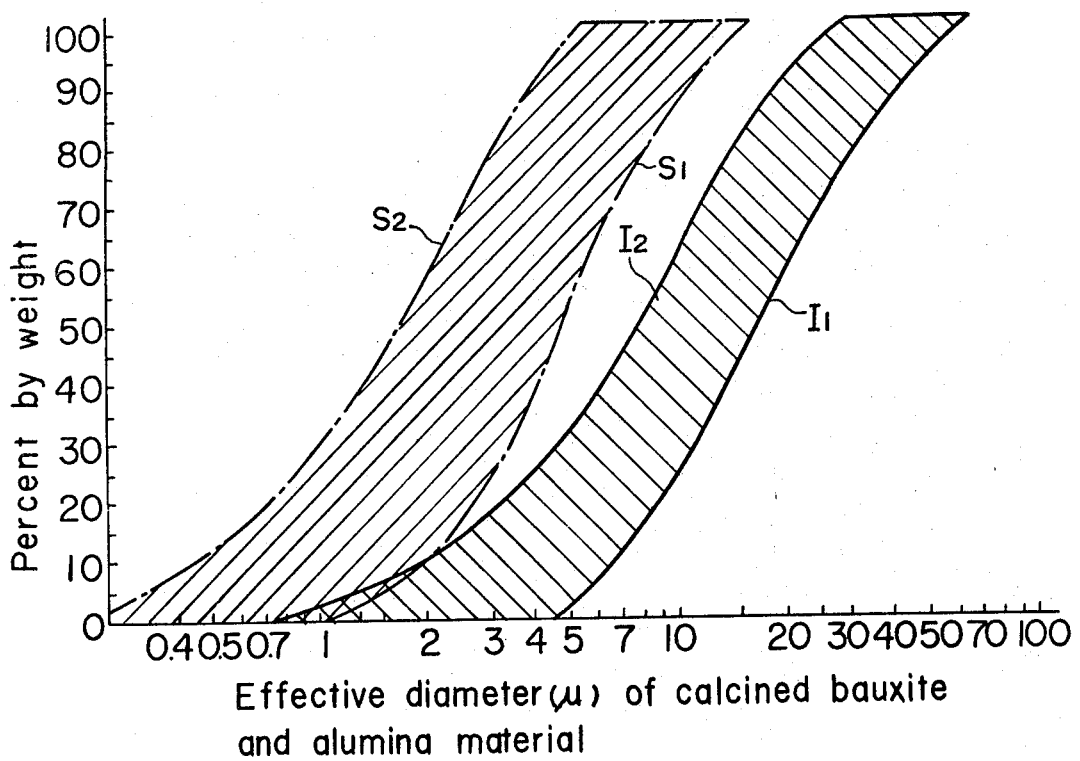
FIG. 2B is a graph showing the grain size distribution of calcined bauxite usable in the method according to the present invention, in comparison with the corresponding grain size distribution of alumina material used in known alumina porcelain.

FIG. 2B illustrates the grain size distribution (as surrounded by curves $S_1$ and $S_2$) of alumina used in a known alumina body, in comparison with the grain size distribution (as surrounded by curves $I_1$ and $I_2$) of calcined bauxite used in a bauxite-containing body usable in the method according to the present invention.

Figure 5:
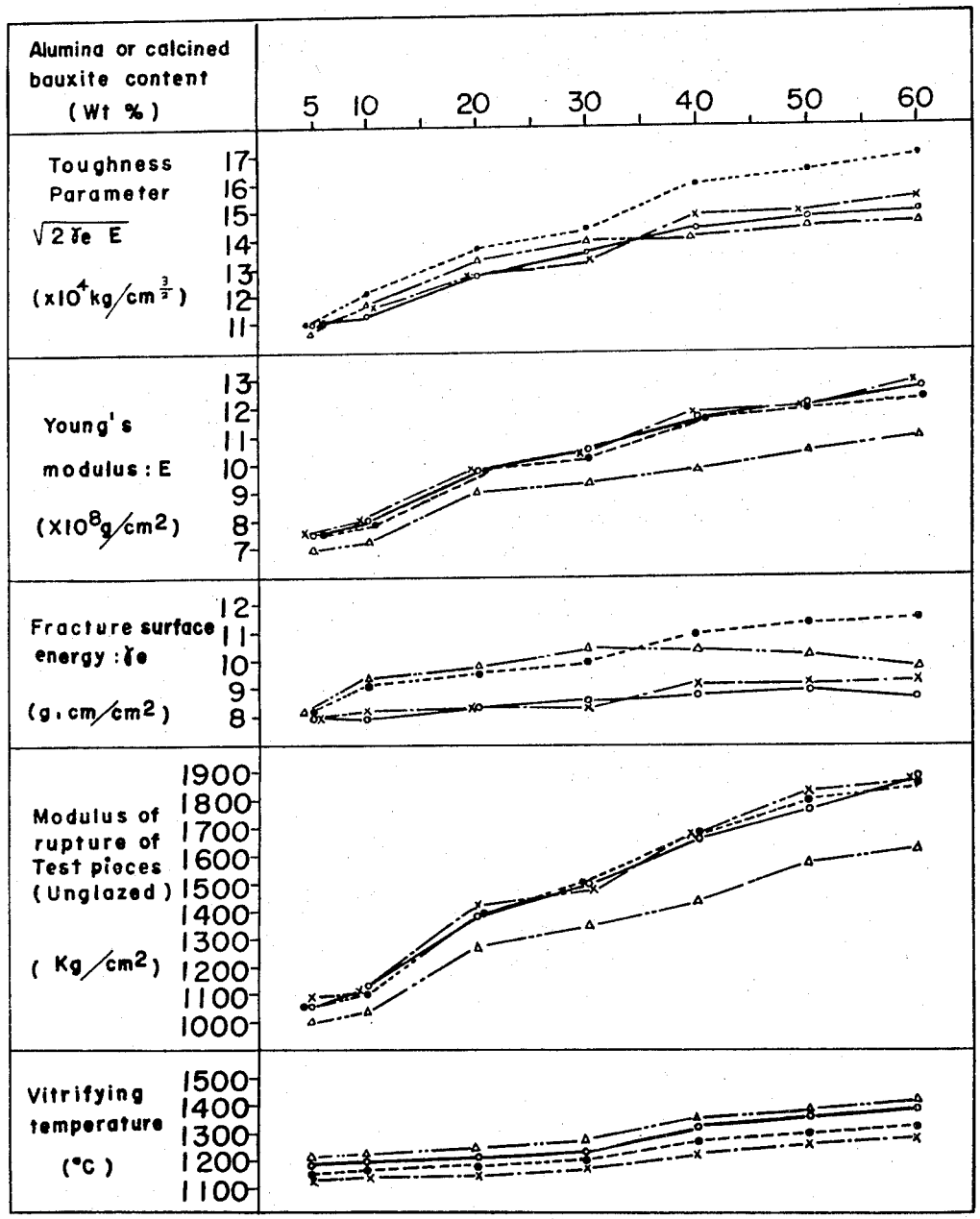
FIG. 5 is a diagrammatic illustration, showing how various properties of porcelain are affected by the content and grain size of alumina or calcined bauxite used in the porcelain.

FIG. 5 shows in dash lines, properties of the porcelain containing the calcined bauxite with the aforesaid grain size distribution, according to the present invention. In the figure, dash-dot lines represent the properties of porcelain containing calcined bauxite with a finer grain size distribution than that of the present invention, while dash-two-dots lines represent the properties of porcelain containing calcined bauxite with a coarser grain size distribution than that of the invention. The properties of porcelain made of a body containing alumina with a grain size distribution corresponding to that of alumina in known porcelain body for electric insulators, are shown by solid lines.

The grain size distribution of calcined bauxite, as shown in FIG. 2B between curves $I_1$ and $I_2$ is tabulated in Table 4.

The properties, as shown in FIG. 5, were measured in the same manner as those of FIG. 4.

Referring to FIG. 5, properties of different porcelain containing calcined bauxite of different grain size distributions at the same rate will now be compared. The porcelain containing the calcined bauxite with the grain size distribution according to the present invention has an excellent toughness as well as outstanding modulus of rupture. The porcelain containing alumina with a known

TABLE 4

| Effective diameter (μ) | Percentage by weight of particles with an effective diameter smaller than the value in column I | |
|---|---|---|
| I | II | III |
| | Limit for coarse distribution | Limit for fine distribution |
| 0.7 | 0 | 0 |
| 1 | 0 | ca. 3 |
| 3 | 0 | ca. 19 |
| 5 | ca. 2 | ca. 32 |
| 8 | 16.0 | 50.0 |
| 10 | 24.0 | 60.0 |
| 15 | 42.0 | 79.0 |
| 20 | 57.0 | 89.0 |
| 25 | 67.0 | 95.0 |
| 30 | 75.0 | 100.0 |
| 40 | 85.0 | 100.0 |
| 50 | 92.0 | 100.0 |
| 60 | 97.0 | 100.0 |
| 70 | 100.0 | 100.0 | grain size distribution has a modulus of rupture substantially comparable with that of the porcelain according to the present invention, while its toughness is much smaller than that of the invention. The porcelain containing calcined bauxite with a finer grain size distribution than that of the invention has a modulus of rupture of the magnitude comparable with that of the invention, but its toughness is considerably smaller than that of the invention. The porcelain containing calcined bauxite with a coarser grain size distribution than that of the invention has a toughness, which is slightly inferior to that of the invention, as long as the content of the calcined bauxite is less than 30.0% by weight, while as the content of the calcined bauxite increases in excess of 40.0% by weight, the toughness of the porcelain is greatly reduced, as compared with that of the present invention. The modulus of rupture of the porcelain containing the aforesaid coarser calcined bauxite is much smaller than that of known alumina porcelain.

The vitrifying temperature of the porcelain containing the calcined bauxite increases as the grain size distribution of the calcined bauxite becomes coarser, and as the content of the calcined bauxite or alumina increases.

When the grain size distribution of the calcined bauxite becomes coarser than that of the present invention, the vitrifying temperature of the porcelain made by using the bauxite becomes higher than that of known alumina porcelain. In fact, the vitrifying temperature of the porcelain containing 40.0% by weight of calcined bauxite with the coarser grain size distribution is about 1,380° C. as shown in FIG. 5. Since the vitrifying temperature of the porcelain exceeds 1,350° C., the addition of such coarse calcined bauxite does not contribute to the improvement of the toughness.

The method of the present invention will now be described in further detail referring to examples. Table 5 tabulates the chemical composition of starting materials used in the following examples.

TABLE 5

| | I | II | III | IV | V | VI |
|---|---|---|---|---|---|---|
| Item | Feldspar (feldspathic material). | Siliceous sand (quartz material). | Gairome clay (clay material). | Alumina (alumina material). | | Calcined bauxite. |
| Place of production | Kanamaru, Niigata-ken, Japan. | U.S.A. | Gifu-ken, Japan. | | | Demerara, British Guiana, South America. |
| Trademark | | | JASPER | | | |
| Raw material | | | | | Commercially available calcined alumina. | |
| Chemical composition (percent by weight): | | | | | | |
| Ignition loss | 0.58 | 0.10 | 13.50 | 0.18 | | 0.30 |
| $SiO_2$ | 67.95 | 99.82 | 48.89 | Trace | | 4.20 |
| $Al_2O_3$ | 17.22 | 0.10 | 33.73 | 99.47 | | 91.23 |
| $Fe_2O_3$ | 0.14 | 0.02 | 1.54 | 0.02 | | 1.07 |
| $TiO_2$ | | 0.01 | 0.98 | Trace | | 2.90 |
| CaO | 0.15 | Trace | 0.33 | 0.05 | | 0.14 |
| MgO | 0.02 | Trace | 0.21 | Trace | | 0.05 |
| $K_2O$ | 10.59 | 0.01 | 0.75 | 0.02 | | 0.04 |
| $Na_2O$ | 3.35 | 0.10 | 0.12 | 0.24 | | 0.04 |
| Total | 100.00 | 100.07 | 100.05 | 99.98 | | 99.97 |

The siliceous sand with a controlled grain size distribution used in the following Examples 1, 2, and 4 was prepared by controlling the grain size of the siliceous sand of Table 5, and the calcined bauxite with a controlled grain size distribution used in the following Examples 3 and 4 was prepared by controlling the grain size of calcined product (calcined bauxite) of bauxite of Table 5, which was produced in Demerara, British Guiana, South America.

EXAMPLE 1

Feldspathic porcelains were prepared, with the composition according to the present invention and with a known composition, as tabulated in Table 6.

Bodies consisting of the ingredients of Table 6 were shaped and fired at 1,250° C. to produce porcelain test pieces. The same bodies were also used in producing suspension insulators by firing at 1,250° C. Various properties of the porcelain test pieces and the suspension insulators were measured, and the results are shown in Table 6. The values of the amount of crystals in Table 6 were obtained by a quantitative analysis by X-ray diffraction. The depth of radial cracks caused by shooting was measured by repeatedly shooting ribs 6a to 6d of each loaded suspension insulator, as shown in FIG. 1, under the following conditions until the shade 5 partially breaks down.

TABLE 6

| Items | Known porcelain | Porcelain of the invention |
|---|---|---|
| Raw material composition (percent by weight): | | |
| Feldspar | 40.0 | 40.0 |
| Siliceous sand [1] | 20.0 | 0.0 |
| Siliceous sand with a controlled grain size distribution [2] | 0.0 | 20.0 |
| Gairome clay | 40.0 | 40.0 |
| Total | 100.0 | 100.0 |
| Properties of porcelain: | | |
| Porcelain test pieces: | | |
| Toughness parameter: $\sqrt{2\gamma_e \cdot E}$ ($\times 10^{4}$ g·cm$^{-\frac{3}{2}}$) | 10.6 | 12.4 |
| Young's modulus: E ($\times 10^5$ g·cm$^{-2}$) | 6.6 | 6.7 |
| Fracture surface energy: $\gamma_e$ (g·cm$^{-2}$) | 8.5 | 11.4 |
| Modulus of rupture (unglazed) (kg./cm.$^2$) | 940 | 970 |
| Amount of crystals (percent by weight): | | |
| Mullite | 21 | 19 |
| Quartz | 8 | 16 |
| Total | 29 | 35 |
| Suspension insulators: | | |
| Tensile strength of sound insulator [3]: $\sigma_1$ (kg.) | 17,300 | 17,400 |
| Depth of radial crack caused by shooting (mm.) | 26 | 8 |
| Tensile strength of insulators after shooting test [4]: $\sigma_2$ (kg.) | 9,600 | 13,900 |
| Tensile strength retaining factor after the shooting test: ($\sigma_2/\sigma_1$)×100 (percent) | 55.6 | 79.9 |

[1] Siliceous sand with a known grain size distribution (Fig. 3A, curve 1, or Table 3, column II)
[2] Siliceous sand with a grain size distribution of the invention (Fig. 3A, curve 2, or Table 3, column III)
[3] Representing the load causing the pin breakdown.
[4] Representing the load causing the porcelain breakdown.

Shooting distance: 45 feet
Shooting angle: 45° with respect to the axis of suspension insulator, from below
Gun and bullet: 22-caliber long rifle, high speed bullets
Load applied on insulator: 10,000 pound tension The depth of radial cracks formed at the time of crashing in the radial direction extending from the plane 7a–7b to the head portion 1 of the porcelain, as shown in FIG. 1, was measured. Since more than one radial cracks can be formed at the time of the crashing, the depth of radial crack was represented by the maximum value of the lengths of the radial cracks as taken from the plane 7a–7b of FIG. 1 to the tip of the cracks extending toward the head portion 1.

The tensile strength of the suspension insulator after the shooting test was determined by measuring the tensile strength of the suspension insulators, which were subjected to the aforesaid shooting test.

The values of various properties as tabulated in Table 6, are mean values of measurements made on seven test pieces and suspension insulators.

It is apparent from Table 6 that the toughness of the porcelain containing siliceous sand with a grain size distribution of the invention is improved, as compared with that of the porcelain containing siliceous sand with a known grain size distribution. The use of the siliceous sand with the grain size distribution of the invention also results in a considerable improvement in the crack-propagation-resistance of suspension insulators or in bullet-resistance thereof. In other words, the length of radial cracks caused by shooting is greatly shortened in the suspension insulator made by using porcelain prepared by the method according to the present invention, as compared with that of known suspension insulators. Thus, the crack-propagation-resistance is considerably improved.

EXAMPLE 2

The composition of alumina bodies used in Example 2 is shown in Table 7, including a body according to the present invention and a known body.

The bodies of Table 7 were shaped and fired at 1,290° C. to produce porcelain test pieces, and the same bodies were used for preparing suspension insulators by firing also at 1,290° C. Various properties of the porcelain test pieces and the suspension insulators were measured. The measurement of the properties in Table 7 was carried out in the same manner as Example 1, except that the tensile load applied on the suspension insulators during the shooting test was 15,000 pounds.

It is apparent from Table 7 that various properties, especially the toughness and crack-propagation-resistance, of the porcelain and suspension insulators can be greatly improved by adding the siliceous sand with the grain size distribution according to the present invention.

EXAMPLE 3

The composition of bauxite-containing bodies used in Example 3 is shown in Table 8, including a body according to the present invention and a known body.

TABLE 7

| Items | Known porcelain | Porcelain of the invention |
|---|---|---|
| Raw material composition (percent by weight): | | |
| Alumina | 30.0 | 30.0 |
| Feldspar | 25.0 | 25.0 |
| Siliceous sand [1] | 10.0 | 0.0 |
| Siliceous sand with a controlled grain size distribution [2] | 0.0 | 10.0 |
| Gairome clay | 35.0 | 35.0 |
| Total | 100.0 | 100.0 |
| Properties of porcelain: | | |
| Porcelain test pieces: | | |
| Toughness parameter: $\sqrt{2\gamma_e \cdot E}$ ($\times 10^4$ g·cm$^{-2}$G) | 13.1 | 15.2 |
| Young's modulus: E ($\times 10^5$ g·cm·c$^2$) | 10.6 | 10.6 |
| Fracture surface energy: $\gamma_e$ (g·cm$^{-2}$) | 8.0 | 10.8 |
| Modulus of rupture (unglazed) (kg./cm.$^2$) | 1,510 | 1,530 |
| Amount of crystals (percent by weight): | | |
| Corundum | 27 | 28 |
| Mullite | 13 | 11 |
| Quartz | 3 | 8 |
| Total | 43 | 47 |
| Suspension insulators: | | |
| Tensile strength of sound insulator [3]: $\sigma_1$ (kg.) | 24,500 | 24,400 |
| Depth of radial crack caused by shooting (mm.) | 20 | 4 |
| Tensile strength of insulators after shooting test [4]: $\sigma_2$ (kg.) | 14,800 | 20,700 |
| Tensile strength retaining factor after the shooting test: ($\sigma_2/\sigma_1$)×100 (percent) | 60.5 | 84.9 |

[1] Siliceous sand with a known grain size distribution (Fig. 3A, curve 1, or Table 3, column II).
[2] Siliceous sand with a grain size distribution of the invention (Fig. 3A, curve 2, or Table 3, column III).
[3] Representing the load causing the pin breakdown.
[4] Representing the load causing the porcelain breakdown.

TABLE 8

| Items | Known alumina porcelain | Porcelain of the invention |
|---|---|---|
| Raw material composition (percent by weight): | | |
| Alumina | 30.0 | 0.0 |
| Calcined bauxite with a controlled grain size distribution [1] | 0.0 | 30.0 |
| Feldspar | 25.0 | 25.0 |
| Siliceous sand | 15.0 | 15.0 |
| Gairome clay | 30.0 | 30.0 |
| Total | 100.0 | 100.0 |
| Properties of porcelain: | | |
| Porcelain test pieces: | | |
| Toughness parameter: $\sqrt{2\gamma_e \cdot E}$ ($\times 10^4$ g.·cm.$^{-\frac{3}{2}}$) | 13.5 | 14.4 |
| Young's modulus: E ($\times 10^5$ g.·cm.$^{-2}$) | 10.6 | 10.3 |
| Fracture surface energy: $\gamma_e$ (g.·cm.·cm.$^{-2}$) | 8.6 | 10.0 |
| Modulus of rupture (unglazed) (kg./cm.$^2$) | 1,510 | 1,520 |
| Suspension insulators: | | |
| Tensile strength of sound insulator [2]: $\sigma_1$ (kg.) | 24,400 | 24,300 |
| Depth of radial crack caused by shooting (mm.) | 18 | 8 |
| Tensile strength of insulators after shooting test [3]: $\sigma_2$ (kg.) | 14,900 | 18,300 |
| Tensile strength retaining factor after the shooting test: $(\sigma_2/\sigma_1) \times 100$ (percent) | 61.1 | 75.3 |

Figure 3B:
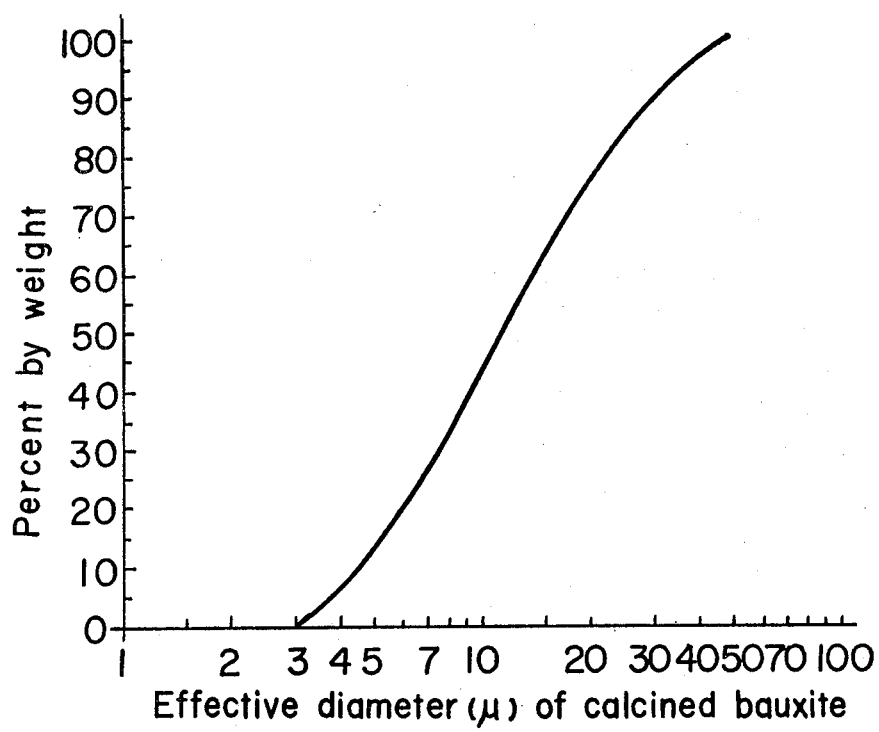
FIG. 3B is a graph showing the grain size distribution of calcined bauxite used in an embodiment of the present invention.

[1] Calcined bauxite with a grain size distribution as shown in Fig. 3B.
[2] Representing the load causing the pin breakdown.
[3] Representing the load causing the procelain breakdown.

The bodies of Table 8 were shaped and fired at 1,290° C. to produce porcelain test pieces, and the same bodies were also used for making suspension insulators by firing at 1,290° C. Various properties of the porcelain test pieces and the suspension insulators thus prepared were measured, and the results are shown in Table 8. The values of the measured properties were obtained by the same method as Example 1, except that the tensile load applied to the suspension insulators during the shooting test was identical with that for Example 2.

It is apparent from Table 8 that the toughness of the porcelain prepared by adding calcined bauxite with the grain size distribution according to the present invention is considerably improved, as compared with that of known alumina porcelain. It should be noted here that the crack-propagation-resistance, as determined by the shooting test, was particularly well improved by the addition of the calcined bauxite with the grain size distribution of the present invention. In other words, the use of the calcined bauxite of the present invention resulted in the shortened length of the radial cracks extending toward the head portion of the insulator porcelain, so that the tensile strength of insulators after the shooting was remarkably improved.

EXAMPLE 4

Bauxite-containing bodies used in Example 4 are shown in Table 9, including a known alumina porcelain body and a body according to the present invention.

The bodies of Table 9 were shaped and fired at 1,290° C. to produce porcelain test pieces, and the same bodies were also used for making suspension insulators by firing at 1,290° C. Various properties of the porcelain test pieces and the suspension insulators thus prepared were measured, and the results are shown in Table 9. The values of the measured properties were obtained by the same method as Example 1, except that the tensile load applied to the suspension insulators during the shooting test was identical with that for Example 2.

It is apparent from Table 9, that the toughness of the porcelain prepared by adding calcined bauxite and siliceous sand, each having the grain size distribution according to the present invention is considerably improved, as compared with that of known alumina porcelain.

As can be seen from Tables 6 to 9, the improved toughness of the porcelain, i.e., the improved crack-propagation-resistance of the porcelain, is in good agreement with the increased crack-propagation-resistance of suspension insulators made of the improved procelain, as determined by the shooting test. In fact, by using the suspension insulators made of the porcelains, according to the present invention, in actual power transmission lines, radial cracks caused by shooting are prevented from propagating into the head portion of the insulator.

TABLE 9

| Items | Known alumina porcelain | Porcelain of the invention |
|---|---|---|
| Raw material composition (percent by weight): | | |
| Alumina | 30.0 | 0.0 |
| Calcined bauxite with a controlled grain size distribution [1] | 0.0 | 30.0 |
| Feldspar | 25.0 | 25.0 |
| Siliceous sand [2] | 10.0 | 0.0 |
| Siliceous sand with a controlled grain size distribution [3] | 0.0 | 10.0 |
| Gairome clay | 35.0 | 35.0 |
| Total | 100.0 | 100.0 |
| Properties of porcelain: | | |
| Porcelain test pieces: | | |
| Toughness parameter: $\sqrt{2\gamma_e \cdot E}$ ($\times 10^4$ g.·cm.$^{-\frac{3}{2}}$) | 13.1 | 17.3 |
| Young's modulus: E ($\times 10^5$ g.·cm.$^{-2}$) | 10.6 | 10.5 |
| Fracture surface energy: $\gamma_e$ (g.·cm.·cm.$^{-2}$) | 8.0 | 14.3 |
| Modulus of rupture (unglazed) (kg./cm.$^2$) | 1,540 | 1,490 |
| Amount of crystals (percent by weight) | | |
| Corundum | 27 | 25 |
| Mullite | 13 | 18 |
| Quartz | 3 | 8 |
| Total | 43 | 51 |
| Suspension insulators: | | |
| Tensile strength of sound insulator [4]: $\sigma_1$ (kg.) | 24,500 | 24,300 |
| Depth of radial crack caused by shooting (mm.) | 20 | 3 |
| Tensile strength of insulators after shooting test [5]: $\sigma_2$ (kg.) | 14,800 | 21,200 |
| Tensile strength retaining factor after the shooting test: $(\sigma_2/\sigma_1) \times 100$ (percent) | 60.5 | 87.2 |

[1] The same as the footnote 1 of Table 8.
[2] Siliceous sand with a known grain size distribution (Fig. 3A, curve 1, or Table 3, column II).
[3] Siliceous sand with a grain size distribution of the invention (Fig. 3A, curve 2, or Table 3, column III).
[4] Representing the load causing the pin breakdown.
[5] Representing the load causing the porcelain breakdown.

As a result, it is possible to minimize the risk of serious line faults, e.g., a line drop fault, due to porcelain breakdown caused by the propagation of cracks.

As described in the foregoing, according to the present invention, there is provided a method for manufacturing porcelain having an improved crack-propagation-resistance, as compared with that of porcelains manufactured by known methods. With porcelains having the thus improved crack-propagation-resistance, the quality of porcelains for insulators can be improved. Thus, the invention contributes greatly to the industry.

Although the present invention has been described referring to suspension insulators, the application of the method of the invention is not restricted to suspension insulators alone, but the method can be applied to the manufacture of various other insulators usable in high voltage power transmission lines.

What is claimed is:

1. A method for manufacturing porcelain for electric insulators with a high crack-propagation-resistance comprising shaping, drying, and firing a dried body at a temperature of 1,180° C. to 1,350° C. to produce a product containing crystallites of undissolved quartz material in a sufficient amount to enhance the crack-propagation-resistance of the porcelain, said dried body consisting of 30 to 50% by weight of feldspathic material, 10 to 30% by weight of quartz, and 30 to 60% by weight of clay material, said quartz material in said dried body having a grain size distribution falling within the following limits:

| Effective diameter (μ) | Percentage by weight of particles with an effective diameter smaller than the value below | |
|---|---|---|
| | Limit for coarse distribution | Limit for fine distribution |
| 8 | 0 | 0 |
| 10 | 0 | 2 |
| 15 | 0 | 40 |
| 20 | 0 | 72 |
| 25 | 26 | 93 |
| 30 | 47 | 100 |
| 40 | 82 | 100 |
| 50 | 97 | 100 |
| 60 | 100 | 100 |

2. A method for manufacturing porcelain for electric insulators with a high crack-propagation-resistance comprising shaping, drying, and firing a dried body at a temperature of 1,180° C. to 1,350° C. to produce a product containing crystallites of undissolved quartz material in a sufficient amount to enhance the crack-propagation-resistance of the porcelain, said dried body consisting of 20 to 40% by weight of feldspathic material, 5 to 25% by weight of quartz material, 20 to 55% by weight of clay material, and 10 to 45% by weight of alumina, said quartz material in said dried body having a grain size distribution falling within the following limits:

| Effective diameter (μ) | Percentage by weight of particles with an effective diameter smaller than the value below | |
|---|---|---|
| | Limit for coarse distribution | Limit for fine distribution |
| 8 | 0 | 0 |
| 10 | 0 | 2 |
| 15 | 0 | 40 |
| 20 | 0 | 72 |
| 25 | 26 | 93 |
| 30 | 47 | 100 |
| 40 | 82 | 100 |
| 50 | 97 | 100 |
| 60 | 100 | 100 |

3. A method for manufacturing porcelain for electric insulators with a high crack-propagation-resistance comprising shaping, drying, and firing a dried body at a temperature of 1,180° C. to 1,350° C. to produce a product containing undissolved mullite in the polycrystalline aggregates of corundum and mullite in a sufficient amount to enhance the crack-propagation-resistance of the porcelain, said dried body consisting of 20 to 40% by weight of feldspathic material, less than 25% by weight of quartz material, 20 to 55% by weight of clay material, and 10 to 60% by weight of calcined bauxite, said calcined bauxite in said body having a grain size distribution falling within the following limits:

| Effective diameter (μ) | Percentage by weight of particles with an effective diameter smaller than the value below | |
|---|---|---|
| | Limit for coarse distribution | Limit for fine distribution |
| 0.7 | 0 | 0 |
| 1 | 0 | ¹3 |
| 3 | 0 | ¹19 |
| 5 | ¹2 | ¹32 |
| 8 | 16 | 50 |
| 10 | 24 | 60 |
| 15 | 42 | 79 |
| 20 | 57 | 89 |
| 25 | 67 | 95 |
| 30 | 75 | 100 |
| 40 | 85 | 100 |
| 50 | 92 | 100 |
| 60 | 97 | 100 |
| 70 | 100 | 100 |

¹ About.

4. A method for manufacturing porcelain for electric insulators according to claim 3, wherein said shaping, drying and firing a dried body at a temperature of 1,180° C. to 1,350° C. produces a product containing crystallites of undissolved quartz material in a sufficient amount to enhance the crack-propagation-resistance of the porcelain and wherein said quartz material in said dried body has a grain size distribution falling within the following limits:

| Effective diameter (μ) | Percentage by weight of particles with an effective diameter smaller than the value below | |
|---|---|---|
| | Limit for coarse distribution | Limit for fine distribution |
| 8 | 0 | 0 |
| 10 | 0 | 2 |
| 15 | 0 | 40 |
| 20 | 0 | 72 |
| 25 | 26 | 93 |
| 30 | 47 | 100 |
| 40 | 82 | 100 |
| 50 | 97 | 100 |
| 60 | 100 | 100 |

5. A method for manufacturing porcelain for electric insulators with a high crack-propagation-resistance comprising shaping, drying, and firing a dried body at a temperature of 1,180° C. to 1,350° C. to produce a product containing undissolved mullite in the polycrystalline aggregates of corundum and mullite in a sufficient amount to enhance the crack-propagation-resistance of the porcelain, said dried body consisting of 20 to 40% by weight of feldspathic material, 20 to 55% by weight of clay material, and 10 to 60% by weight of calcined bauxite, said calcined bauxite in said dried body having a grain size distribution falling within the following limits:

| Effective diameter (μ) | Percentage by weight of particles with an effective diameter smaller than the value below | |
|---|---|---|
| | Limit for coarse distribution | Limit for fine distribution |
| 0.7 | 0 | 0 |
| 1 | 0 | ¹3 |
| 3 | 0 | ¹19 |
| 5 | ¹2 | ¹32 |
| 8 | 16 | 50 |
| 10 | 24 | 60 |
| 15 | 42 | 79 |
| 20 | 57 | 89 |
| 25 | 67 | 95 |
| 30 | 75 | 100 |
| 40 | 85 | 100 |
| 50 | 92 | 100 |
| 60 | 97 | 100 |
| 70 | 100 | 100 |

¹ About.

6. Porcelain comprising the vitrified product produced by shaping, drying, and firing a dried body at a temperature of 1,180° C. to 1,350° C. to produce a product containing crystallites of undissolved quartz material in a sufficient amount to enhance the crack-propagation-resistance of the porcelain, said dried body consisting of 30 to 50% by weight of feldspathic material, 10 to 30% by weight of quartz material and 30 to 60% by weight of clay material, said quartz material in said dried body having a grain size distribution falling with the following limits:

| Effective diameter (μ) | Percentage by weight of particles with an effective diameter smaller than the value below | |
|---|---|---|
| | Limit for coarse distribution | Limit for fine distribution |
| 8 | 0 | 0 |
| 10 | 0 | 2 |
| 15 | 0 | 40 |
| 20 | 0 | 72 |
| 25 | 26 | 93 |
| 30 | 47 | 100 |
| 40 | 82 | 100 |
| 50 | 97 | 100 |
| 60 | 100 | 100 |

7. Porcelain comprising the vitrified product produced by shaping, drying, and firing a dried body at a temperature of 1,180° C. to 1,350° C. to produce a product containing crystallites of undissolved quartz material in a sufficient amount to enhance the crack-propagation-resistance of the porcelain, said dried body consisting of 20 to 40% by weight of feldspathic material, 5 to 25% by weight of quartz material, 20 to 55% by weight of clay material, and 10 to 45% by weight of alumina, said quartz material in said dried body having a grain size distribution falling within the following limits:

| Effective diameter (μ) | Percentage by weight of particles with an effective diameter smaller than the value below | |
|---|---|---|
| | Limit for coarse distribution | Limit for fine distribution |
| 8 | 0 | 0 |
| 10 | 0 | 2 |
| 15 | 0 | 40 |
| 20 | 0 | 72 |
| 25 | 26 | 93 |
| 30 | 47 | 100 |
| 40 | 82 | 100 |
| 50 | 97 | 100 |
| 60 | 100 | 100 |

8. Porcelain comprising the vitrified product produced by shaping, drying, and firing a dried body at a temperature of 1,180° C. to 1,350° C. to produce a product containing undissolved mullite in the polycrystalline aggregates of corundum and mullite in a sufficient amount to enhance the crack-propagation-resistance of the porcelain, said dried body consisting of 20 to 40% by weight of feldspathic material, less than 25% by weight of quartz material, 20 to 55% by weight of clay material, and 10 to 60% by weight of calcined bauxite, said calcined bauxite in said dried body having a grain size distribution falling within the following limits:

| Effective diameter (μ) | Percentage by weight of particles with an effective diameter smaller than the value below | |
|---|---|---|
| | Limit for coarse distribution | Limit for fine distribution |
| 0.7 | 0 | 0 |
| 1 | 0 | [1] 3 |
| 3 | 0 | [1] 19 |
| 5 | [1] 2 | [1] 32 |
| 8 | 16 | 50 |
| 10 | 24 | 60 |
| 15 | 42 | 79 |
| 20 | 57 | 89 |
| 25 | 67 | 95 |
| 30 | 75 | 100 |
| 40 | 85 | 100 |
| 50 | 92 | 100 |
| 60 | 97 | 100 |
| 70 | 100 | 100 |

[1] About.

9. Porcelain according to claim 8 wherein said shaping, drying, and firing a dried body at a temperature of 1,180° C. to 1,350° C. produces a product containing crystallites of undissolved quartz material in a sufficient amount to enhance the crack-propagation-resistance of the porcelain and wherein said quartz material in said dried body has a grain size distribution falling within the following limits:

| Effective diameter (μ) | Percentage by weight of particles with an effective diameter smaller than the value below | |
|---|---|---|
| | Limit for coarse distribution | Limit for fine distribution |
| 8 | 0 | 0 |
| 10 | 0 | 2 |
| 15 | 0 | 40 |
| 20 | 0 | 72 |
| 25 | 26 | 93 |
| 30 | 47 | 100 |
| 40 | 82 | 100 |
| 50 | 97 | 100 |
| 60 | 100 | 100 |

10. Porcelain comprising the vitrified product produced by shaping, drying, and firing a dried body at a temperature of 1,180° C. to 1,350° C. to produce a product containing undissolved mullite in the polycrystalline aggregates of corundum and mullite in a sufficient amount to enhance the crack-propagation-resistance of the porcelain, said dried body consisting of 20 to 40% by weight of feldspathic material, 20 to 55% by weight of clay material, and 10 to 60% by weight of calcined bauxite, said calcined bauxite in said dried body having a grain size distribution falling within the following limits:

| Effective diameter (μ) | Percentage by weight of particles with an effective diameter smaller than the value below | |
|---|---|---|
| | Limit for coarse distribution | Limit for fine distribution |
| 0.7 | 0 | 0 |
| 1 | 0 | [1] 3 |
| 3 | 0 | [1] 19 |
| 5 | [1] 2 | [1] 32 |
| 8 | 16 | 50 |
| 10 | 24 | 60 |
| 15 | 42 | 79 |
| 20 | 57 | 89 |
| 25 | 67 | 95 |
| 30 | 75 | 100 |
| 40 | 85 | 100 |
| 50 | 92 | 100 |
| 60 | 97 | 100 |
| 70 | 100 | 100 |

[1] About.

References Cited

UNITED STATES PATENTS

| | | | |
|---|---|---|---|
| 2,887,394 | 5/1959 | Bickford et al. | 106—46 |
| 2,898,217 | 8/1959 | Selsing | 106—46 |
| 3,097,101 | 7/1963 | Lester | 106—46 |
| 3,365,314 | 1/1968 | Sack | 106—46 X |
| 3,432,313 | 3/1969 | Gitzen et al. | 106—46 |
| 3,442,668 | 5/1969 | Fenerty et al. | 106—46 X |
| 3,459,567 | 8/1969 | Yamamoto et al. | 106—46 |

OTHER REFERENCES

Kingery, W. D.; Pressure Forming of Ceramics, in Ceramic Fabrication Processes; New York, 1958, pp. 55–59.

Kingery, W. D.; Introduction to Ceramics; New York, 1960, pp. 435, 607 and 625.

TOBIAS E. LEVOW, Primary Examiner

W. R. SATTERFIELD, Assistant Examiner

U.S. Cl. X.R.

170—140; 264—61